US012743426B2

(12) United States Patent
Krishna et al.

(10) Patent No.: US 12,743,426 B2
(45) Date of Patent: Sep. 22, 2026

(54) GENERATING A UNIFILED KNOWLEDGE GRAPH FROM MULTIMODAL DATA SOURCES USING COLLABORATIVE MULTI-AGENT LARGE LANGUAGE MODELS

(71) Applicant: TATA CONSULTANCY SERVICES LIMITED, Mumbai (IN)

(72) Inventors: Ankur Krishna, Pune (IN); Surya Ardham, Hyderabad (IN); Chetan Premkumar Malhotra, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 19/334,072

(22) Filed: Sep. 19, 2025

(65) Prior Publication Data

US 2026/0093701 A1 Apr. 2, 2026

(30) Foreign Application Priority Data

Sep. 30, 2024 (IN) ............................ 202421074061

(51) Int. Cl.
*G06F 16/20* (2019.01)
*G06F 16/2455* (2019.01)
(Continued)

(52) U.S. Cl.
CPC ......... *G06F 16/2455* (2019.01); *G06N 3/042* (2023.01); *G06N 5/022* (2013.01); *G06N 5/043* (2013.01)

(58) Field of Classification Search
CPC ............... G06F 16/243; G06F 16/2455; G06F 16/33295; G06F 16/367; G06N 3/042; G06N 5/022; G06N 5/043
See application file for complete search history.

(56) References Cited

U.S. PATENT DOCUMENTS

2023/0061210 A1* 3/2023 Gordan .................. G06F 40/40
2025/0200095 A1* 6/2025 Bandyopadhyay ... G06F 16/345
(Continued)

FOREIGN PATENT DOCUMENTS

CN 118519739 A 8/2024
CN 118520071 A 8/2024

*Primary Examiner* — Diedra McQuitery
(74) *Attorney, Agent, or Firm* — Finnegan, Henderson, Farabow, Garrett & Dunner, LLP

(57) ABSTRACT

Existing multi-agent system are employed collaboratively, where each agent specialized in extracting entities, relations, or events from documents which is a more generalized collaborative framework without specific customizations. The disclosed method presents a collaborative multi-agent knowledge graph Retrieval-Augmented Generation (RAG) framework using a plurality of collaborative multi-agent LLMs for extracting information from a plurality of multimodal documents and constructing the unified knowledge graph to facilitate accurate and efficient query-based retrieval. A query generator agent generates a plurality of queries that aim to uncover all possible information present in the plurality of multimodal documents. A domain model is generated by a domain model generator agent based on the plurality of queries. The domain model populator agent populates the domain model with data extracted from the plurality of multimodal documents. A unified knowledge graph is constructed from ta plurality of populated domain models and organizes the extracted information for accurate retrieval.

15 Claims, 5 Drawing Sheets

(51) Int. Cl.
*G06N 3/042* (2023.01)
*G06N 5/022* (2023.01)
*G06N 5/043* (2023.01)

(56) References Cited

U.S. PATENT DOCUMENTS

2025/0258855 A1* 8/2025 Ustyuzhanin ....... G06F 16/3322
2026/0064746 A1* 3/2026 Zhang ............... G06F 16/24575

* cited by examiner

300 receiving a plurality of multimodal documents, and a plurality of domain historical questions pertaining to the plurality of multimodal documents 302 processing the plurality of multimodal documents to identify the text and the plurality of images, using a python library 304 chunking, via one or more hardware processors, the text and the plurality of images into a plurality of chunks comprising a plurality of text chunks, and a plurality of image chunks 306 generating a unified knowledge graph from the plurality of chunks, using a plurality of collaborative multi-agent large language models (LLMs), wherein the plurality of collaborative multi-agent LLMs comprises a query generator agent, a domain model generator agent, a domain model populator agent, and a knowledge graph curator agent, wherein generating the unified knowledge graph comprises: 308 generating a plurality of queries associated with each chunk of the plurality of chunks, through the query generator agent 308a

FIG. 3A

generating a domain model associated with each chunk of the plurality of chunks based on the generated plurality of queries, through the domain model generator agent 308b

Populating the generated domain model using each chunk of the plurality of chunks, to generate a populated domain model of a plurality of populated domain models for each chunk of the plurality of chunks, through the domain model populator agent 308c generating the unified knowledge graph associated with each chunk of the plurality of chunks, using the plurality populated domain models, through the knowledge graph curator agent 308d

FIG. 3B

GENERATING A UNIFILED KNOWLEDGE GRAPH FROM MULTIMODAL DATA SOURCES USING COLLABORATIVE MULTI-AGENT LARGE LANGUAGE MODELS

PRIORITY CLAIM

This U.S. patent application claims priority under 35 U.S.C. § 119 to: Indian Patent Application number 202421074061, filed on Sep. 30, 2024. The entire contents of the aforementioned application are incorporated herein by reference.

TECHNICAL FIELD

The disclosure herein generally relates to multi-agent Large Language Models (LLMs), and, more particularly, to a method and system for generating a unified knowledge graph from multimodal data sources using collaborative multi-agent LLMs.

BACKGROUND

The proliferation of digital documents, particularly in PDF format, has created significant challenges in information retrieval and knowledge management across various industries. While Large Language Models (LLMs) have shown remarkable capabilities in natural language processing tasks, their application to complex information extraction from unstructured documents remains still challenging. Conventional Retrieval-Augmented Generation (RAG) approaches have made significant strides in enhancing document querying by combining the strengths of the LLMs with information retrieval techniques. However, these approaches often struggle with maintaining context over long documents, handling complex multi-hop queries, and providing transparent reasoning paths. Moreover, the flat structure of typical RAG approaches limits their ability to capture and utilize the hierarchical nature of information present in many documents.

Knowledge Graph (KG) approaches offer a superior alternative for document querying and information retrieval. By representing information as interconnected entities and relationships, the KG approaches can capture the semantic structure of documents more effectively. This hierarchical representation enables more nuanced and context-aware querying, supports multi-hop reasoning, and provides clear provenance for extracted information. Furthermore, the KG approaches allow for the integration of domain-specific knowledge and ontologies, enhancing the overall quality and relevance of query responses. However, the generation of high-quality KGs from unstructured text remains a significant challenge. Existing approaches for KG creation often produce graphs with superficial or less meaningful relationships between nodes, resulting in limited utility for complex querying and knowledge discovery. The main challenges lie in accurately identifying relevant entities, establishing meaningful relationships, and capturing the hierarchical structure of information present in the source documents.

SUMMARY

Embodiments of the present disclosure present technological improvements as solutions to one or more of the above-mentioned technical problems recognized by the inventors in conventional systems. For example, in one embodiment, a method for generating a unified knowledge graph from multimodal data sources using collaborative multi-agent Large Language Models. The method includes receiving a plurality of multimodal documents, and a plurality of domain historical questions pertaining to the plurality of multimodal documents. Further the method includes processing the plurality of multimodal documents to identify text and a plurality of images, using a python library. Further the method included chunking the text and the plurality of images into a plurality of chunks comprising a plurality of text chunks, and a plurality of image chunks. Furthermore, the method includes generating the unified knowledge graph from the plurality of chunks, using a plurality of collaborative multi-agent large language models (LLMs), wherein the plurality of collaborative multi-agent LLMs comprises a query generator agent, a domain model generator agent, a domain model populator agent, and a knowledge graph curator agent. The unified knowledge graph generation is generated by: (i) generating a plurality of queries associated with each chunk of the plurality of chunks, through the query generator agent comprises: (a) building a query agent, by defining a plurality of query generator behavioral parameters, and a plurality of query generator functional specification parameters through an input JavaScript Object Notation (JSON) model, wherein the plurality of query generator behavioural parameters comprises a query generator role, an agent knowledge enriched using the plurality of domain historical questions, a query generator interface, and wherein the plurality of query generator functional specification parameters comprises a plurality of query generator actions, a plurality of tasks comprising a plurality of query generator tasks and a plurality of query generator evaluation tasks, a feedback from the plurality of collaborative multi-agent LLMs, and a plurality of query generator tools; (b) formulating a query prompt template using a plurality of instructions, the plurality of chunks, an action, and the query agent; (c) generating a query prompt using the query prompt template; and (d) feeding the query prompt to the query generator agent, to generate the plurality of queries associated with each chunk of the plurality of chunks; (ii) generating a domain model associated with each chunk of the plurality of chunks based on the generated plurality of queries, through the domain model generator agent; (ii) populating the generated domain model using each chunk of the plurality of chunks, to generate a populated domain model of a plurality of populated domain models for each chunk of the plurality of chunks, through the domain model populator agent; and (iii) generating the unified knowledge graph associated with each chunk of the plurality of chunks, using the plurality populated domain models, through the knowledge graph curator agent.

In another aspect, a system for generating a unified knowledge graph from multimodal data sources using collaborative multi-agent Large Language Models. The system comprising: a memory storing instructions; one or more communication interfaces; and one or more hardware processors coupled to the memory (102) via the one or more communication interfaces, wherein the one or more hardware processors are configured by the instructions to: receive a plurality of multimodal documents, and a plurality of domain historical questions pertaining to the plurality of multimodal documents; process the plurality of multimodal documents to identify text and a plurality of images, using a python library; chunk the text and the plurality of images into a plurality of chunks comprising a plurality of text chunks, and a plurality of image chunks; and generate a unified knowledge graph from the plurality of chunks, using a plurality of collaborative multi-agent large language models (LLMs), wherein the plurality of collaborative multi-agent LLMs comprises a query generator agent, a domain model generator agent, a domain model populator agent, and a knowledge graph curator agent, wherein generating the unified knowledge graph comprises: (i) generating a plurality of queries associated with each chunk of the plurality of chunks, through the query generator agent comprises: (a) building a query agent, by defining a plurality of query generator behavioral parameters, and a plurality of query generator functional specification parameters through an input JavaScript Object Notation (JSON) model, wherein the plurality of query agent behavioral parameters comprises a query generator role, an agent knowledge enriched using the plurality of domain historical questions, a query generator interface, and wherein the plurality of query generator functional specification parameters comprises a plurality of query generator actions, a plurality of tasks comprising a plurality of query generator tasks and a plurality of query generator evaluation tasks, a feedback from the plurality of collaborative multi-agent LLMs, and a plurality of query generator tools; (b) formulating a query prompt template using a plurality of instructions, the plurality of chunks, an action, and the query agent; (c) generating a query prompt using the query prompt template; and (d) feeding the query prompt to the query generator agent, to generate the plurality of queries associated with each chunk of the plurality of chunks; (ii) generating a domain model associated with each chunk of the plurality of chunks based on the generated plurality of queries, through the domain model generator agent; (iii) populating the generated domain model using each chunk of the plurality of chunks, to generate a populated domain model of a plurality of populated domain models for each chunk of the plurality of chunks, through the domain model populator agent; and (iv) generating the unified knowledge graph associated with each chunk of the plurality of chunks, using the plurality populated domain models, through the knowledge graph curator agent.

In yet another aspect, a non-transitory computer readable medium for generating a unified knowledge graph from multimodal data sources using collaborative multi-agent Large Language Models is provided. The method includes receiving a plurality of multimodal documents, and a plurality of domain historical questions pertaining to the plurality of multimodal documents. Further the method includes processing the plurality of multimodal documents to identify text and a plurality of images, using a python library. Further the method included chunking the text and the plurality of images into a plurality of chunks comprising a plurality of text chunks, and a plurality of image chunks. Furthermore, the method includes generating the unified knowledge graph from the plurality of chunks, using a plurality of collaborative multi-agent large language models (LLMs), wherein the plurality of collaborative multi-agent LLMs comprises a query generator agent, a domain model generator agent, a domain model populator agent, and a knowledge graph curator agent. The unified knowledge graph generation is generated by: (i) generating a plurality of queries associated with each chunk of the plurality of chunks, through the query generator agent comprises: (a) building a query agent, by defining a plurality of query generator behavioral parameters, and a plurality of query generator functional specification parameters through an input JavaScript Object Notation (JSON) model, wherein the plurality of query generator behavioural parameters comprises a query generator role, an agent knowledge enriched using the plurality of domain historical questions, a query generator interface, and wherein the plurality of query generator functional specification parameters comprises a plurality of query generator actions, a plurality of tasks comprising a plurality of query generator tasks and a plurality of query generator evaluation tasks, a feedback from the plurality of collaborative multi-agent LLMs, and a plurality of query generator tools; (b) formulating a query prompt template using a plurality of instructions, the plurality of chunks, an action, and the query agent; (c) generating a query prompt using the query prompt template; and (d) feeding the query prompt to the query generator agent, to generate the plurality of queries associated with each chunk of the plurality of chunks; (ii) generating a domain model associated with each chunk of the plurality of chunks based on the generated plurality of queries, through the domain model generator agent; (ii) populating the generated domain model using each chunk of the plurality of chunks, to generate a populated domain model of a plurality of populated domain models for each chunk of the plurality of chunks, through the domain model populator agent; and (iii) generating the unified knowledge graph associated with each chunk of the plurality of chunks, using the plurality populated domain models, through the knowledge graph curator agent.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A, and 3B (collectively represented as FIG. 3) depict a flow diagram of a method for generating the unified knowledge graph from the multimodal data sources using the plurality of collaborative multi-agent LLMs, using the system of FIG. 1, in accordance with some embodiments of the present disclosure.

Figure 1:
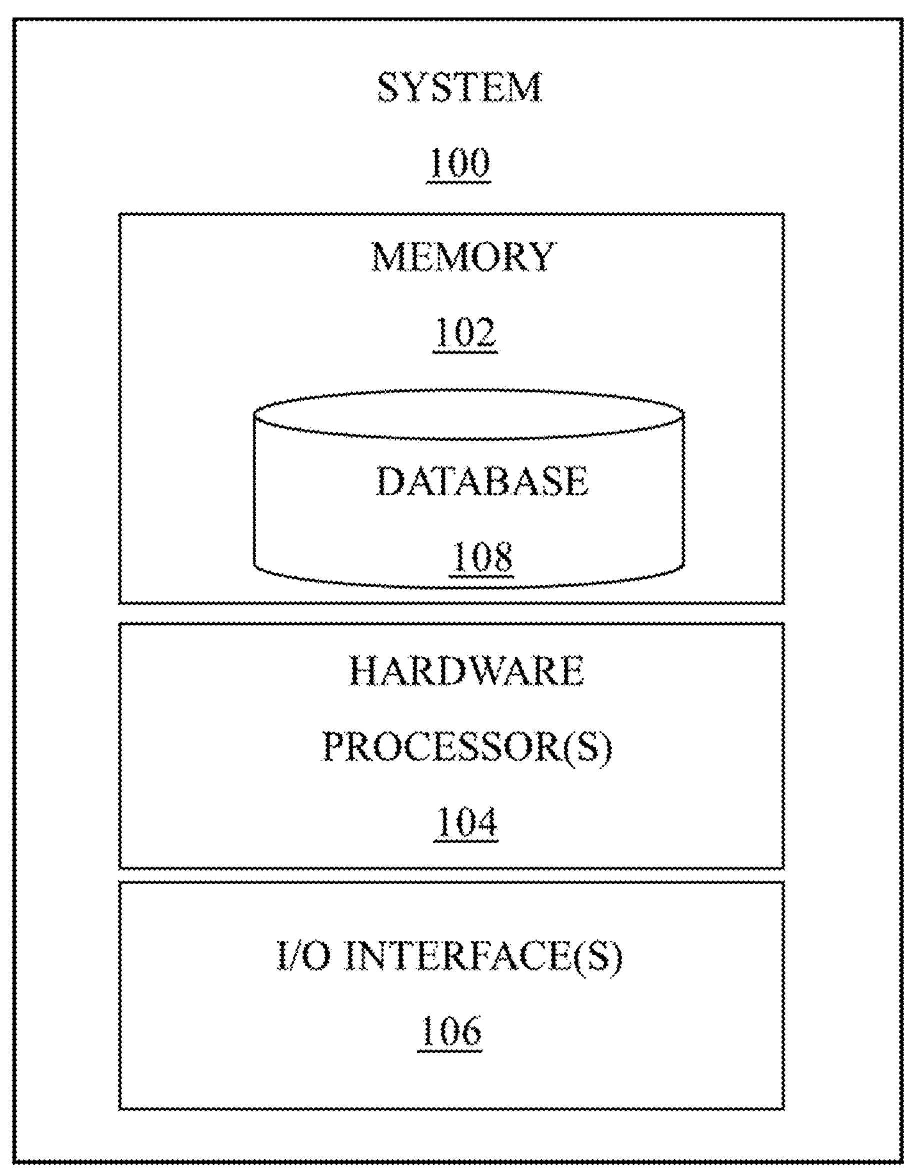
FIG. 1 illustrates an exemplary system for generating a unified knowledge graph from multimodal data sources using a plurality of collaborative multi-agent Large Language Models (LLMs) according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

A substantial volume of knowledge resides within industries, predominantly in unstructured, non-query able formats. Industries are persistently seeking methods to render this unstructured data accessible on demand to facilitate informed decision-making, as opposed to relying solely on individual expertise or knowledge. With the advent of Large Language Models (LLMs), Retrieval-Augmented Generation (RAG) approaches have emerged, which vectorize unstructured data into a vector store and retrieve it based on word similarity matches. The LLMs are neural networks trained on vast amounts of text data to perform a wide range of natural language processing tasks. These models, such as GPT (Generative Pre-trained Transformer) series, Bidirectional Encoder Representations from Transformers (BERT), and Text-To-Text Transfer Transformer (T5), have demonstrated remarkable capabilities in understanding and generating human-like text. The LLMs have shown proficiency in tasks including text summarization, question answering, and language translation. However, their application to complex information retrieval and knowledge structuring tasks remains a challenging task.

Knowledge Graphs (KGs) are structured representations of information that capture entities and their relationships in a graph format. The KGs have become fundamental in various applications, including semantic search, question answering systems, and recommender systems. They provide a means to organize and query complex, interconnected information efficiently. Several approaches exist in literature for automatically generating KGs from unstructured text such as rule-based approaches, supervised learning approaches, unsupervised and semi-supervised approaches, and neural network-based approaches. The rule-based approaches use predefined patterns and rules to extract entities and relationships from text. While these rule-based approaches are effective for specific domains, they often lack flexibility and require significant manual effort to create and maintain rules. The supervised learning approaches use machine learning models trained on annotated datasets to identify entities and relations in text. They can be more adaptable than the rule-based approaches but require large amounts of labelled training data. The unsupervised and semi-supervised approaches attempt to extract knowledge graph elements with minimal or no labeled data, often using techniques like clustering or distant supervision. They can be more scalable but may suffer from lower precision.

The neural network-based approaches have shown promising role in capturing complex semantic relationships but often struggle with producing meaningfully structured and hierarchical knowledge representations. However, a significant drawback of these approaches is their limited accuracy with factual data or aggregation-type queries, particularly as corpus size increases. Further KG approaches offer a superior alternative for document querying and information retrieval. Furthermore, the KG approaches allow for the integration of domain-specific knowledge and ontologies, enhancing the overall quality and relevance of query responses. However, the generation of high-quality KGs from unstructured text remains a significant challenge. Existing approaches for KG generation often produce graphs with superficial or less meaningful relationships between nodes, resulting in limited utility for complex querying and knowledge discovery. The main challenges lie in accurately identifying relevant entities, establishing meaningful relationships, and capturing the hierarchical structure of information present in the source documents. Further Retrieval-Augmented Generation (RAG) approaches have demonstrated significant effectiveness in querying private, short, unstructured data. However, they often struggle to provide accurate factual answers when dealing with larger corpora, frequently lacking context and failing to establish domain relationships.

Recent advancements in Artificial Intelligence (AI) have shown the potential of multi-agent systems for tackling complex tasks. These approaches distribute cognitive load across multiple specialized agents, often leading to more robust and effective solutions. In literature ("P. Chen, B. Han, and S. Zhang, "CoMM: Collaborative Multi-Agent, Multi-Reasoning-Path Prompting for Complex Problem Solving," arXiv: 2404.17729v1 [cs.CL], Apr. 26, 2024.") introduced the Collaborative Multi-Agent, Multi-Reasoning-Path (CoMM) prompting framework. In this approach the LLMs play different roles in a problem-solving team, encouraging collaborative problem-solving. The CoMM applies different reasoning paths for different roles, effectively implementing few-shot prompting in multi-agent scenarios. This work demonstrated significant improvements in solving complex college-level science problems. Further in literature AutoGen ("Q. Wu, G. Bansal, J. Zhang, Y. Wu, B. Li, E. Zhu, L. Jiang, X. Zhang, S. Zhang, J. Liu, A. H. Awadallah, R. W. White, D. Burger, and C. Wang, "AutoGen: Enabling Next-Gen LLM Applications via Multi-Agent Conversation,") introduced a framework for building multi-agent systems with the LLMs. This work highlights how different agents can be assigned specific roles and collaborate to solve complex tasks, providing a foundation for multi-agent systems in various domains. Furthermore ChatDev ("C. Qian, W. Liu, H. Liu, N. Chen, Y. Dang, J. Li, C. Yang, W. Chen, Y. Su, X. Cong, J. Xu, D. Li, Z. Liu, and M. Sun, "ChatDev: Communicative Agents for Software Development," arXiv: 2307.07924 [cs.SE], 2024.") demonstrates a collaborative software development framework using multiple LLM-based agents. This demonstrates how multi-agent approaches can be applied to complex creative tasks like software development. Further task-oriented dialogue systems in literature ("W. He, Y. Sun, M. Yang, F. Ji, C. Li, and R. Xu, "Multi-goal multi-agent learning for task-oriented dialogue with bidirectional teacher-student learning," Knowledge-Based Systems, vol. 210, p. 106667, 2020. doi:") is a multi-agent framework for task-oriented dialogue systems that illustrates how multiple specialized agents can work together to handle complex conversational tasks. The existing multi-agent LLMs are focusing on document generation, using techniques like named entity recognition (NER), relation extraction (RE), and event extraction (EE). the existing multi-agent LLMs are employed collaboratively, where each agent specializes in extracting entities, relations, or events from the documents. Further the existing multi-agent LLMs are using a more generalized collaborative framework without specific customizations The existing generalized collaborative framework face challenges such as limited contextual understanding, coordination overhead, inflexibility in task specialization, and scalability issues. The generalized collaborative framework having the limited contextual understanding might struggle to capture nuanced context, as agents operate on predefined tasks without adapting to the specific content or domain of the document. This can lead to missed nuances or misinterpretations in entity, relation, or event extraction. In the generalized collaborative framework, the agents might face inefficiencies due to lack of streamlined communication and coordination protocols. This can result in redundant efforts, conflicting outputs, or delays in processing as agents may not effectively share insights or adjustments based on collective findings. Further in the existing generalized collaborative framework do not have flexibility in task specialization such that the agents might be limited in their ability to adapt to the varying complexities of different documents. This inflexibility can hinder performance in specialized domains where unique extraction strategies or methodologies are necessary to achieve high accuracy. Further the scalability issues in the existing generalized framework may not scale well with increased document complexity or volume. As the number of the agents and tasks grows, managing interactions and ensuring efficient processing becomes increasingly difficult, potentially leading to bottlenecks or degraded performance.

Embodiments herein provide a method and system for generating a unified knowledge graph from multimodal data sources using a plurality of collaborative multi-agent LLMs, in accordance with some embodiments of the present disclosure. The proposed method presents a collaborative multi-agent knowledge graph RAG framework designed to enhance the capabilities of LLMs in complex information retrieval scenarios. The collaborative multi-agent knowledge graph RAG framework comprises a domain model generator agent, a domain model populator agent, and a knowledge graph curator agent, each tailored through a customization model. The query generator agent formulates a plurality of queries related to a plurality of text chunks and a plurality of image chunks within a plurality of multimodal documents, while the domain model generator agent constructs a domain model based on the plurality of queries. A domain model populator agent populates the domain model with data extracted from the plurality of multimodal documents. The knowledge graph curator agent generates the unified knowledge graph in Neo4j (e.g., a graph database management system), from a plurality of populated domain models and organizing the extracted information for accurate retrieval. Each LLM of the plurality of collaborative multi-agent LLMs interacts with one another, evaluates the outputs, and provides feedback to enhance the retrieval process. Further one or more queries are transformed into cipher queries using an LLM, processed by a unified knowledge graph engine, and converted back to a human interpretable natural language. The disclosed method enhances information retrieval from the plurality of multimodal documents by reducing hallucinations, incomplete responses, and factual inaccuracies. The disclosed method is evaluated against the publicly available technical report "Operations & Maintenance Best Practices" and state-of-the-art knowledge graph generation software, Neo4j Graph Builder. The results demonstrate that the proposed method identifies a substantially higher number of entities and discovers unique, contextually significant relationships, surpassing the performance of the graph builder in both quantity and quality of extracted information.

Referring now to the drawings, and more particularly to FIG. 1 through FIG. 4, where similar reference characters denote associated features consistently throughout the figures, there are shown preferred embodiments, and these embodiments are described in the context of the following exemplary system and/or method.

FIG. 1 is a functional block diagram of a system 100 for generating the unified knowledge graph from the multimodal data sources using the plurality of collaborative multi-agent LLMs, in accordance with some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors.

Referring to the components of the system 100, in an embodiment, the processor(s) 104 can be the one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) 106 can include one or more ports for connecting a number of devices to one another or to another server.

The memory 102 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. Thus, the memory 102 may comprise information pertaining to input(s)/output(s) of each step performed by the processor(s) 104 of the system 100 and methods of the present disclosure. In an embodiment, a database 108 is comprised in the memory 102, wherein the database 108 comprises information on the plurality of multimodal documents, a plurality of domain historical questions, text, a plurality of images, the plurality of text chunks, the plurality of image chunks, the unified knowledge graph, the plurality of queries, a plurality of query generator behavioral parameters, a plurality of query generator functional specification parameters, a plurality of knowledge graph query behavioral parameters, a plurality of knowledge graph query functional specification parameters, The database 108 further comprises information on a plurality of domain model generator behavioral parameters, a plurality of domain model generator functional specification parameters, a plurality of domain model populator behavioral parameters, a plurality of domain model populator functional specification parameters, a plurality of knowledge graph curator behavioral parameters, a plurality of knowledge graph curator functional specification parameters, and thereof.

The memory 102 further comprises a plurality of modules for various technique(s) such as python library, the query generator agent, the domain model generator agent, the domain model populator agent, a knowledge graph curator agent, a knowledge graph query agent, a query agent, a unified knowledge graph query agent, a domain model agent, a domain model populating agent, a knowledge graph agent, and thereof. The above-mentioned technique(s) are implemented as at least one of a logically self-contained part of a software program, a self-contained hardware component, and/or, a self-contained hardware component with a logically self-contained part of a software program embedded into each of the hardware component (e.g., hardware processor 104 or memory 102) that when executed perform the method described herein.

The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
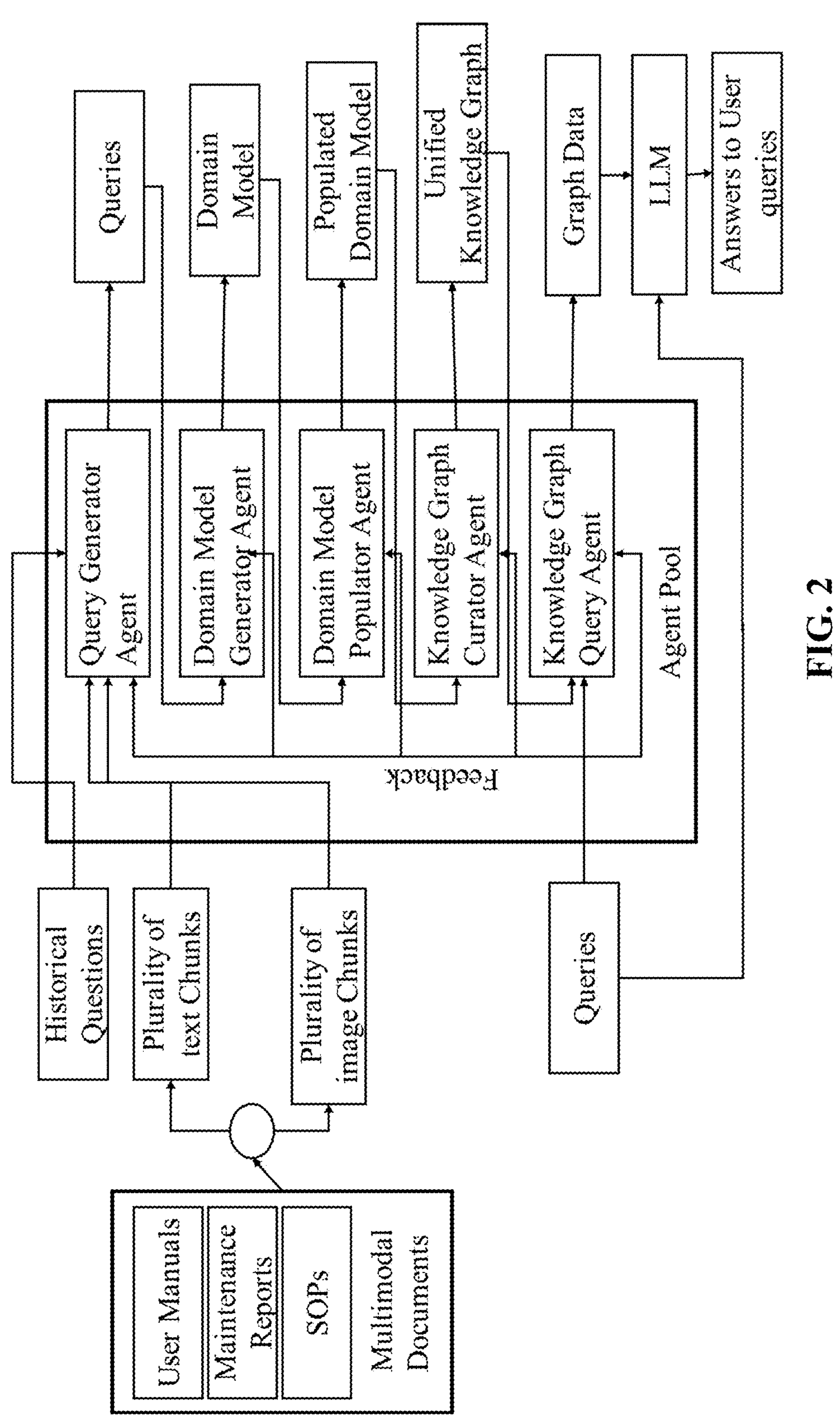
FIG. 2 is a functional architecture depicting process flow of the system for generating the unified knowledge graph from the multimodal data sources using the plurality of collaborative multi-agent LLMs according to some embodiments of the present disclosure.

FIG. 2 is a functional architecture depicting process flow of the system 100 of FIG. 1 for generating the unified knowledge graph from the multimodal data sources using the plurality of collaborative multi-agent LLMs according to some embodiments of the present disclosure. The functional architecture describes receiving the plurality of multimodal documents, and the plurality of domain historical questions pertaining to the plurality of multimodal documents. The plurality of multimodal documents comprises user manuals, maintenance reports, standard operating procedures (SOPs), and thereof. An agent pool depicted in FIG. 2 comprises the query generator agent, the domain model generator agent, the domain model populator agent, the knowledge graph curator agent, and the unified knowledge graph query agent. The plurality of text chunks and the plurality of plurality of image chunks along with the plurality of domain historical questions are fed to the query generator agent to generate the plurality of queries associated with each chunk of a plurality of chunks. The domain model generator agent generates the domain model using the generated plurality of queries. The domain model populator agent populates the generated domain model using each chunk of the plurality of chunks to generate a populated domain model of the plurality of populated domain models for each chunk of the plurality of chunks. The knowledge graph curator agent generates the unified knowledge graph associated with each chunk of the plurality of chunks, using the plurality populated domain models. The knowledge graph query agent queries the generated unified knowledge graph to generate a graph data based on one or more queries. Finally, the graph data is converted to a human interpretable natural language to provide answers to the one or more queries, using the LLM.

FIGS. 3A and 3B collectively represented as FIG. 3 depict a flow diagram of a method for generating the unified knowledge graph from the multimodal data sources using the plurality of collaborative multi-agent LLMs using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 400 by the processor(s) 104. The steps of the method 400 of the present disclosure will now be explained with reference to the components or blocks of the system 100 as depicted in FIG. 1, the functional architecture depicted in FIG. 2, and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Referring to steps of FIG. 3, at step 302 of the method 300, the one or more hardware processors 104 receive the plurality of multimodal documents, and the plurality of domain historical questions pertaining to the plurality of multimodal documents. The plurality of domain historical questions refers to past queries that users have posed, often in specific contexts or domains. These questions may encompass a range of topics, issues, or themes relevant to a user base. By analyzing the plurality of domain historical questions, the query generator agent can better understand user intent, preferences, and intricacies of domain-specific language.

The plurality of domain historical questions provides crucial context that allows the query generator agent to interpret current user queries more effectively. For example, if users frequently ask about "boiler pressure checks", the query generator agent can associate this term with maintenance best practices and respond more accurately. By examining the plurality of domain historical questions, the query generator agent can identify common trends in boiler maintenance inquiries, such as seasonal concerns about heating efficiency during winter months. The plurality of historical questions helps the query generator agent generate responses that directly address user needs. If past queries often include, "What should I do if my boiler leaks?" the query generator agent can be trained to provide a detailed troubleshooting guide when similar questions arise. By reviewing the plurality of historical questions and historical interactions, the query generator agent can learn from previous inaccuracies. If it repeatedly misinterprets queries about "boiler maintenance frequency", adjustments can be made to improve accuracy. Further the plurality of historical questions enables the query generator agent to offer personalized responses. For instance, if the user often asks about "energy-saving tips for boilers", the query generator agent can prioritize this information, making interactions feel more relevant and tailored. Furthermore, the plurality of historical questions allows the query generator agent to engage in meaningful conversations. If the user previously inquired about "boiler safety checks", the query generator agent can follow up with questions like, "Have you performed your annual safety inspection yet?". Further the plurality of historical questions contributes to a more extensive and nuanced knowledge base. For instance, queries about specific boiler brands and models help the query generator agent understand variations in maintenance practices. The range of questions submitted by users reflects diverse perspectives and experiences, enriching the query generator agent ability to address various user needs. The plurality of historical questions creates a feedback loop that supports continuous learning. By tracking which queries receive the most engagement, the query generator agent can adapt its training data accordingly. The plurality of historical questions can serve as benchmarks for evaluating the query generator agent performance, enabling developers to measure improvements and identify areas for further training.

At step 304 of the method 300, the one or more hardware processors 104 process the plurality of multimodal documents to identify the text and the plurality of images, using a python library.

At step 306 of the method 300, the one or more hardware processors 104 chunk, the text and the plurality of images into the plurality of chunks comprising the plurality of text chunks, and the plurality of image chunks.

At step 308 of the method 300, the one or more hardware processors 104 generate the unified knowledge graph from the plurality of chunks, using the plurality of collaborative multi-agent LLMs. The plurality of collaborative multi-agent LLMs comprises the query generator agent, the domain model generator agent, the domain model populator agent, the knowledge graph curator agent, and the knowledge graph query agent. The plurality of collaborative multi-agent LLMs collaborate leveraging natural language processing and structured data mapping capabilities. The plurality of collaborative multi-agent LLMs interact with integrated tools such as text analysis algorithms, graph modeling tools, and data cleaning systems, as well as external Application programming interfaces (APIs) for industry standards and graph visualization. The disclosed collaborative multi-agent knowledge graph RAG framework allows for specialized knowledge to be applied at each stage of the unified knowledge graph generation process, from generation of the plurality of queries to creation of a complex hierarchical unified knowledge graph. The disclosed method handles large volumes of the text and complex domain structures efficiently. The key features of the plurality of collaborative multi-agent LLMs comprises adaptive learning capabilities, improving performance with exposure to diverse manual content, seamless integration between the plurality of collaborative multi-agent LLMs with feedback loops for continuous improvement, customizable options for different domains, operational needs, and industry-specific requirements, strong focus on data quality, ensuring accuracy, completeness, and relevance of the generated unified knowledge graph.

For generating the unified knowledge graph, a customization model is built for each of the plurality of collaborative multi-agent LLMs. The customization model comprises two scalable components such as a behavioral customization and a functional specification. The scalable components are modular elements that enable the customization model to grow and adapt to varying user requirements without compromising the accuracy. The behavioral customization involves adjusting responses, interactions, and domain of the plurality of collaborative multi-agent LLMs, which includes roles, the domain knowledge, and interface. This ensures that plurality of collaborative multi-agent LLMs behave in a way that aligns with the defined parameters and delivers relevant, context-aware responses. For instance, if the role is a "Maintenance Engineer", the LLM of the collaborative multi-agent LLMs will tailor its responses to provide maintenance-related guidance, for the domain knowledge the LLM adjust its responses to leverage its expertise in specific areas like "Oil and Gas Industry Equipment Maintenance", and for the interface if interface type of the LLM is text-based with capabilities for natural language understanding, it interacts through text to understand and generate responses accordingly. For example, if the LLM is tasked with providing safety guidelines, it uses the domain knowledge and the role definitions to ensure that its responses are relevant to the oil and gas industry and adhere to safety protocols.

The functional specification involves defining specific capabilities, actions, tasks, tools that the LLM should handle. It details what the LLM should be able to do and how it should perform these functions based on predefined attributes. The capabilities and actions are outlined in the functional specification that the LLM is expected to do. The actions comprise core actions and extended actions. The core actions include fundamental tasks that the LLM should handle, such as "Providing maintenance procedures" and "Troubleshooting assistance". The extended actions include additional tasks like "Generating equipment manuals" and "Offering safety guidelines". The tasks include primary tasks which are essential tasks such as "Routine maintenance scheduling" and "Emergency repair guidance", advanced Tasks such as more specialized tasks like "Optimizing equipment performance" and "Conducting safety audits". The tools comprise integrated tools like systems or databases that the LLM should use internally, such as "Equipment databases" and "Maintenance tracking systems" and external tools like external resources or APIs that the LLM should interact with, such as "APIs for industry standards and regulations". For example, the LLM should be able to extract information from integrated equipment databases to provide detailed maintenance procedures and use external APIs to stay updated on industry standards and regulations.

Generating the unified knowledge graph from the plurality of chunks, using a plurality of collaborative multi-agent LLMs is explained through steps **304*a* through 304*d* of the method 300. At step 304*a*, the method 300** generates the plurality of queries associated with each chunk of the plurality of chunks, through the query generator agent. For example, the query generator agent simulates a field engineer or operator, generating the plurality of queries that are relevant to the domain. For a boiler maintenance example, the key capabilities of the query generator agent comprise (a) formulating questions about maintenance procedures for various boiler types, (b) generating queries related to troubleshooting common boiler issues, (c) creating questions about inspection processes, including Non-Destructive Examination (NDE) methods, (d) asking about safety protocols and compliance guidelines. The query generator agent is highly customizable and can be adapted to generate the plurality of queries for any industry or domain, not just boiler maintenance. The steps for generating the plurality of queries associated with each chunk of the plurality of chunks, through the query generator agent comprises:

(a) Building the query agent, by defining the plurality of query generator behavioral parameters, and the plurality of query generator functional specification parameters through an input JavaScript Object Notation (JSON) model. The query agent is the customization model of the query generator agent. The plurality of query generator behavioural parameters comprises a query generator role, an agent knowledge enriched using the plurality of domain historical questions, and a query generator interface. The plurality of query generator functional specification parameters comprises a plurality of query generator actions, the plurality of tasks comprising a plurality of query generator tasks and a plurality of query generator evaluation tasks, the feedback from the plurality of collaborative multi-agent LLMs, and a plurality of query generator tools. The plurality of query generator tools helps the query generator agent to interact with external environment to gather useful information for processing of tasks. The plurality of query generator tools encompasses a variety of technologies that facilitate information retrieval and processing. Examples include database management systems like My Structured Query Language (MySQL) and MongoDB, which store and manage data, search engines such as Elasticsearch and Apache Solr for full-text search, Application Programming Interface (API) query tools like Graph Query Language (GraphQL) and Representational State Transfer Representational State Transfer (REST)ful APIs for data access, data analytics tools including Apache Spark and Tableau for insights, natural language processing libraries like SpaCy and Natural Language Toolkit (NLTK), business intelligence platforms such as Power Business Intelligence (BI) and Looker for visual reporting, custom query builders like Knex.js for constructing SQL queries, and collaborative tools like Jupyter Notebooks and Google Data Studio for interactive data exploration. Together, these tools enhance the functionality and effectiveness of the query generator agent.

(b) Formulating a query prompt template using a plurality of instructions, the plurality of chunks, an action, and the query agent (c) Generating a query prompt using the query prompt template.

(d) Feeding the query prompt to the query generator agent, to generate the plurality of queries associated with each chunk of the plurality of chunks.

The query prompt template formulated according to some embodiments of present disclosure as "You are an operator with expertise in cable installation and maintenance, tasked with generating questions which actual operators on working oil & gas field would ask. Your goal is to create questions based solely on the provided text content. Model Definition (for reference): {query_generator_agent} Text Content: {text_chunk/image} Generate {num_questions} questions from the above text content".

At step 304*b*, the method 300, the one or more hardware processors generate(s) the domain model associated with each chunk of the plurality of chunks based on the generated plurality of queries, through the domain model generator agent. The domain model generator agent creates the plurality of populated domain models from the plurality multimodal documents. The key capabilities of the domain model generator agent comprise detailed entity extraction, multi-level relationship identification, hierarchical structure creation, attribute detailing, and ontology integration and cross-domain connection identification. This domain model generator agent is essential for creating the plurality of populated domain models with multi-level relationships and attributes that enable construction of a precise and semantically rich unified knowledge graph. The steps for generating the domain model associated with each chunk of the plurality of chunks based on the generated plurality of queries, through the domain model generator agent comprises:

(a) Building the domain model agent, by defining the plurality of domain model generator behavioral parameters, and the plurality of domain model generator functional specification parameters. The domain model agent is the customization model of the domain model generator agent. The plurality domain model generator behavioral parameters comprise a domain model generator role, the domain knowledge, and a domain model generator interface. The plurality of domain model generator functional specification parameters comprises a plurality of domain model generator actions, a plurality of domain model generator tasks comprising a plurality of domain model generator query tasks and a plurality of domain model generator evaluation tasks, the feedback from the plurality of collaborative multi-agent LLMs, and a plurality of domain model generator tools. The plurality of domain model generator tools facilitates the creation of structured representations for enhanced information capture. Examples include Unified Modeling Language (UML) tools like PlantUML and StarUML for diagramming, Entity-Relationship (ER) modeling tools such as Lucidchart and dbdiagram.io for database design, and code generation tools like JHipster and Yeoman for scaffolding applications. For NoSQL databases, Hackolade and MongoDB Compass provide visual modeling capabilities, while API modeling tools like Swagger (OpenAPI) and Postman help define and generate API documentation. Additionally, Domain-specific Language (DSL) tools like Xtext and ANother Tool for Language Recognition (ANTLR) enable the development of custom programming languages and domain-specific languages, streamlining the modeling process and improving efficiency.

(b) Formulating a domain model generator prompt template using the plurality of instructions, the plurality of queries associated with each chunk of the plurality of chunks, and the action, and the domain model agent.

(c) Generating a domain model generator prompt from the domain model generator prompt template.

(d) Feeding a domain model generator prompt to the domain model generator agent to generate the domain model associated with each chunk of the plurality of chunks based on the generated plurality of queries.

The formulation of the domain model generator prompt according to some embodiments of the present disclosure is as follows "You are an AI agent acting as a Comprehensive Domain Model Generator. Your task is to create a detailed, hierarchical schema for neo4j graph database with nodes and relations based on the provided information.

Agent Model: {domain model generator agent}

Manual Text: {manual_text}

Generated quries: {generated_queries}

Create a comprehensive schema includes:

1. Main entities with descriptions
2. Detailed attributes for each entity
3. Sub-entities to represent hierarchical structures
4. Relationships between entities, including relationship types and details.

Avoid generic relationships and ensure all relationships are meaningful and contextually appropriate.

5. Cross-domain connections where applicable
6. Any implicit relationships or attributes you can infer The model is hierarchical, with main entities containing sub-entities where appropriate is ensured.

Focus on creating a structure that will be suitable for generating a knowledge graph.

IMPORTANT: Provide the domain model as a raw JSON object without any additional formatting or Markdown syntax. The response should be a valid JSON string that can be directly parsed by a JSON parser.

Begin the JSON object with {{and end with}} without any additional characters or formatting.

Do not populate the values of the nodes only mention the keys and relationships in JSON."

At step 304*c*, the method 300 populates the generated domain model using each chunk of the plurality of chunks, to generate the populated domain model of the plurality of populated domain models for each chunk of the plurality of chunks, through the domain model populator agent. The domain model populator agent populates the domain model with content from the plurality of multimodal documents. The key capabilities of the domain model populator agent comprise content extraction and mapping to the domain model, relationship population, and contextual analysis, implicit information inference, and consistency validation. The steps for populating the generated domain model using each chunk of the plurality of chunks, to generate the populated domain model of the plurality of populated domain models for each chunk of the plurality of chunks, through the domain model populator agent comprises:

(a) Building the domain model populating agent, by defining the plurality of domain model populator behavioral parameters, and the plurality of domain model populator functional specification parameters. The domain model populating agent is the customization model of the domain model populator agent. The plurality of domain model populator behavioral parameters comprise a domain model populator role, the domain knowledge, a domain model populator interface. The domain model populator functional specification parameters comprise a plurality of domain model populator actions, a plurality of domain model populator tasks comprising a plurality of domain model populator query tasks and a plurality of domain model populator evaluation tasks, the feedback from the plurality of collaborative multi-agent LLMs, a plurality of domain model populator tools. The plurality of domain model populator tools are designed to automate and streamline the process of filling the domain models with data. Examples include data migration tools like Talend and Apache Niagara Files (NiFi), which facilitate data transfer across systems, and mock data generators such as Mockaroo and Faker that create realistic test data. Database population tools like DBMonster and DbForge Data Generator generate large volumes of test data for databases, while API testing tools like Postman and SoapUI can populate the plurality of populated domain models during API testing. Extract, Transform, Load (ETL) tools like Apache Airflow and Informatica manage complex data pipelines for populating the plurality of populated domain models from the plurality of multimodal documents. Additionally, custom scripting solutions using languages like Python or Ruby on Rails fixtures can be developed to read and insert data as needed.

(b) Formulating a domain model populator prompt template using the plurality of instructions, the plurality of chunks, the domain model, the action, and the domain model populating agent.

(c) Generating a domain model populator prompt from the domain model populator prompt template.

(d) Feeding the domain model populator prompt to the domain model populator agent, to generate the plurality of populated domain models associated with each chunk of the plurality of chunks.

Formulation of the domain model populator prompt template according to some embodiments of the present disclosure as follows:

"You are an AI agent responsible for populating a domain model with content from technical manuals.

Use the following model definition to guide your task:

{domain model populator agent}

Here is the domain model structure to be populated:

{domain_model}

Here is the extracted text from the manual:

{input_text}

Your task is to populate the domain model with relevant information from the text. Follow these guidelines:

1. Maintain the structure and relationships defined in the model.
2. Extract entities, attributes, relationships, and hierarchical information as specified in your agent model.
3. Ensure that the populated model contains all necessary information for effective knowledge graph generation.
4. Pay special attention to maintaining the hierarchy and connections between entities.
5. If you encounter information that doesn't fit the current model structure, add it as additional attributes or relationships.
6. Cross-reference information across different sections of the input text to ensure comprehensive population.
7. Resolve any inconsistencies or conflicts in the information, prioritizing the most recent or most relevant data.
8. IMPORTANT: Omit any fields, attributes, or relationships for which no information is found in the text. Do not include empty fields or fields marked as "Not found in text".

Provide the populated domain model in JSON format. Do not include any explanations or metadata about the agent or the process in your response, just the pure JSON of the populated domain model.

IMPORTANT: Provide the domain model as a raw JSON object without any additional formatting or Markdown syntax. The response should be a valid JSON string that can be directly parsed by a JSON parser. Begin the JSON object with {{and end with}} without any additional characters or formatting."

At step 304*d*, the method 300/the one or more hardware processors generate(s) the unified knowledge graph associated with each chunk of the plurality of chunks, using the plurality populated domain models, through the knowledge graph curator agent. The knowledge graph curator agent creates the unified knowledge graph in Neo4j from the plurality of populated domain models. The key capabilities of the knowledge graph curator agent comprise converting domain models to graph structures, generating cypher queries for graph creation, ensuring full connectivity and hierarchy, performing data cleaning and normalization, optimizing graph structure and implementing advanced graph algorithms. The generation of the unified knowledge graph associated with each chunk of the plurality of chunks, using the plurality populated domain models, through the knowledge graph curator agent comprises:

(a) Building the knowledge graph agent, by defining the plurality of knowledge graph curator behavioral parameters, and the plurality of knowledge graph curator functional specification parameters. The knowledge graph is the customization model of the knowledge graph curator agent. The plurality of knowledge graph curator behavioral parameters comprises a knowledge graph curator role, the domain knowledge, and a knowledge graph curator interface. The plurality of knowledge graph curator functional specification parameters comprises a plurality of knowledge graph curator actions, a plurality of knowledge graph curator tasks comprising a plurality of knowledge graph curator query tasks and a plurality of knowledge graph curator evaluation tasks, the feedback from the plurality of collaborative multi-agent LLMs, and a plurality of knowledge graph curator tools. The plurality of knowledge graph curator tools helps create, manage, and enhance the unified knowledge graph, which structure information for better accessibility. Notable examples include graph database platforms like Neo4j and Amazon Neptune, which facilitate building and querying the unified knowledge graph. Ontology editors such as Protege and WebProtégé allow for the creation and management of knowledge representations. Visualization tools like Gephi and Graphistry help analyze and explore graph data. Data integration tools, including Apache Jena and Talend, connect various sources to populate the unified knowledge graph, while construction tools like Kgtk and Stardog provide functionalities for manipulating graph data. Additionally, AI-powered tools like Diffbot automate data extraction from web pages, and OpenRefine aids in data cleanup, further enhancing development and maintenance of the unified knowledge graph.

(b) Formulating a knowledge graph curator prompt template using instructions, the plurality of populated domain model, the action, and the knowledge graph agent.

(c) Generating a knowledge graph curator prompt from the knowledge graph curator prompt template.

(d) Feeding the knowledge graph curator prompt to the knowledge graph curator agent, to generate the unified knowledge graph associated with each chunk of the plurality of chunks.

Formulation of the knowledge graph curator prompt template according to some embodiments of present disclosure is as follows:

"#Knowledge Graph Instructions for GPT-4o

1. Overview

You are a top-tier algorithm designed for extracting information in structured formats to build a knowledge graph.

Nodes represent entities and concepts.

Relationships link the nodes and define the nature of their connections.

Properties are key-value pairs associated with nodes and relationships.

2. Cypher Query Format

For each entity:

Create a node using the format: 'CREATE (n: NODE_LABEL {{id:

'NODE_ID', propertyl: 'value1', . . . }})'

Ensure NODE_ID and properties are correctly quoted and escaped.

For each relationship:

Create a relationship using the format: 'MATCH (a: NODE_LABEL {{id: 'NODE_ID'}}), (b: NODE_LABEL {{id: 'NODE_ID'}}) CREATE (a)-[: REL_TYPE {propertyl: 'value1', . . . }]→(b)'

3. Node and Relationship Guidelines

Use consistent labels for similar types of nodes (e.g., "Person" for all person entities).

Meaningful Relationships: Create relationships that are specific, descriptive, and contextually appropriate between nodes. Avoid generic types like "is part of" or "includes." Interpret the context of the entities to define relationships that accurately reflect their interactions or connections. For example, use relationship types like "WORKS_FOR" instead of just "ASSOCIATED_WITH."

4. Handling Numerical Data and Dates

Numerical data, like age or other related information, should be incorporated as attributes or properties of the respective nodes.

No Separate Nodes for Dates/Numbers: Do not create separate nodes for dates or numerical values. Always attach them as attributes or properties of nodes.

Property Format: Properties must be in a key-value format.

Quotation Marks: Never use escaped single or double quotes within property values.

Naming Convention: Use camelCase for property keys, e.g., 'birthdate'.

5. Coreference Resolution

Maintain Entity Consistency: When extracting entities, it's vital to ensure consistency.

If an entity, such as "John Doe", is mentioned multiple times in the text but is referred to by different names or pronouns (e.g., "Joe", "he"), always use the most complete identifier for that entity throughout the knowledge graph. In this example, use "John Doe" as the entity ID. Remember, the knowledge graph should be coherent and easily understandable, so maintaining consistency in entity references is crucial.

6. Hierarchical Structure

Ensure that entities are organized in a hierarchical manner where applicable.

Use relationships like "IS_PART_OF" or "BELONGS_TO" to establish clear parent-child relationships.

7. Full Connectivity

Ensure that every node is connected to at least one other node in the graph.

If an entity seems isolated, consider its potential relationships with existing entities".

The plurality of collaborative multi-agent LLMs provide the feedback among each other through a text-based interface, evaluating each other's outputs based on criteria such as completeness, accuracy, logical correctness, and intent. If an output falls short, the LLM of the plurality of collaborative multi-agent LLMs offers specific feedback highlighting areas for improvement. Each LLM of the plurality of collaborative multi-agent LLMs works as a task processor and evaluator (feedback provider) for remaining LLMs of the plurality of collaborative multi-agent LLMs. This iterative process continues until the output meets quality standards and the plurality of collaborative multi-agent LLMs are satisfied with results.

Upon generation of the unified knowledge graph, it is queried through the knowledge graph query agent by:

(i) Receiving the one or more queries pertaining to the plurality of multimodal documents from one or more users.

(ii) Building the unified knowledge graph query agent, by defining the plurality of knowledge graph query behavioral parameters, and the plurality of knowledge graph query functional specification parameters. The knowledge graph query agent is the customization model of the knowledge graph query agent. The plurality of knowledge graph query behavioral parameters comprises the domain model generator role, the domain knowledge, and the domain model generator interface. The plurality of knowledge graph query functional specification parameters comprises the plurality of domain model generator actions, the plurality of domain model generator tasks comprising a plurality of knowledge graph query tasks and a plurality of knowledge graph evaluation tasks, the feedback from the plurality of collaborative multi-agent LLMs, and the plurality of domain model generator tools.

(iii) Formulating a knowledge graph query template using the plurality of instructions, a schema model, the one or more queries, and the unified knowledge graph agent.

(iv) Generating a knowledge graph query prompt from the knowledge graph query prompt template.

(v) Feeding the knowledge graph query prompt to the knowledge graph query agent, to generate a cypher query for the knowledge graph engine.

(vi) Generating a response comprising the graph data retrieved using a pattern matching from the unified knowledge graph, by the knowledge graph engine.

(vii) Processing the response from the knowledge graph engine along with the one or more queries and the prompt to convert the graph data to the human interpretable natural language, to provide answers to the one or more queries, using the Large Language Model (LLM).

Formulating the knowledge graph query template according to some embodiments of the present disclosure is as follows:

"Human: Task: Generate Cypher statement to query a graph database. Instructions: Use only the provided relationship types and properties in the schema. Do not use any other relationship types or properties that are not provided.

Schema: {schema}

Note: Do not include any explanations or apologies in your responses.

Do not respond to any questions that might ask anything else than for you to construct a Cypher statement.

Do not include any text except the generated Cypher statement.

when a question is asked about the timelines of incident make sure that the cypher query consists of date datatype when writing the query The question is: {question}."

Experimental Results

For experiments, a publicly available technical report "Operations & Maintenance Best Practices: A Guide to Achieving Operational Efficiency" published by the Pacific Northwest National Laboratory was utilized. This chapter specifically focuses on boilers, their types, components, maintenance, and efficiency. This chapter of the PDF was converted to a text file, preserving the document's structure. Importantly, while the experiments focused on boiler maintenance, the plurality of collaborative multi-agent LLMs was designed to be highly flexible and can be leveraged for any industry or domain. By customizing the query generator agent and adjusting the domain knowledge of remaining LLMs of the plurality of collaborative multi-agent LLMs, the proposed method can be applied to diverse fields such as healthcare, finance, manufacturing, or any other area where structured knowledge extraction from technical documents is required. The disclosed method enables to generate comprehensive, hierarchical unified knowledge graphs that accurately represent complex domains, as described in the plurality of multimodal documents, while being adaptable to a wide range of industries and applications.

Quantitative Results

Knowledge Graph Statistics: Number of entities extracted: 112 entities (e.g., AirHeater, Boiler, Burner, CableManagement, EfficiencyImprovement, WaterTubeBoiler, Document, Deaerators, DeficientAir, DiagnosticTools, etc.), Number of relationships identified: 18 relationships (e.g., AFFECTS, HAS_COMPONENT, SUPPORTS, MEASURES, IMPLEMENTED_IN, REDUCES, USES, BETTER_THAN, COMMONLY_ASSOCIATED_WITH, CRITICAL_FOR, etc.)

Question Generation Metrics: Total Number of Questions Generated by the query generator agent: The query generator agent successfully generated a total of 100 queries, designed to probe various aspects of boiler operation and efficiency. The total number of questions can be adjusted based on user requirements. The plurality of queries generated as follows: Maintenance: Example: "What equipment is used to determine combustion efficiency in a boiler?" and "How can scale formation in a boiler be prevented?". Safety: Example: "What are the potential consequences of having deficient air in a boiler?" and "What are the safety implications of improper boiler maintenance?". Troubleshooting: Example: "What is a major problem associated with heat recovery in flue gas?" and "How can the energy from blowdown be recovered in a boiler?". Other: Example: "What is cogeneration in the context of boiler operation?" and "How can the vertical temperature in a boiler room indicate air stratification?".

Comparative Analysis: Comparison with Baseline Methods

Traditional Rule-Based Information Extraction: Rule-based methods rely on manually crafted rules for extracting entities and relationships from text. While effective in specific, narrow domains, these approaches often lack scalability and adaptability to diverse datasets.

Single-LLM Approach without Multi-Agent Framework: Large language models (LLMs), such as GPT-3 and ChatGLM, had shown promise in natural language processing tasks. However, during attempts made to apply a single-LLM system for Knowledge Graph Construction (KGC), it was observed significant limitations in the generation of meaningful relationships and schema alignment. The single-agent approach often struggled with complex multi-step inference, leading to suboptimal performance in relation extraction and coherence across entities. This highlights that the plurality of collaborative multi-agent LLMs outperform solitary LLMs by enhancing knowledge selection, correction, and aggregation through agent synergy.

Comparison with GraphRAG: Neo4j's Ecosystem Tools: Objective: To evaluate and compare the performance of the plurality of collaborative multi-agent LLMs against Neo4j's GraphRAG tools in terms of the number of nodes, relationships, and other relevant metrics created in the unified knowledge graph. The comparison of the plurality of collaborative multi-agent LLMs against Neo4j's GraphRAG tools is shown in Table. 1. Neo4j's GraphRAG Ecosystem Tools enhance GenAI applications by integrating retrieval-augmented generation (RAG) with knowledge graphs. These open-source tools address issues like hallucination and lack of domain-specific context by combining structured and semi-structured data. This improves response quality and accelerates application development.

TABLE 1

| Criteria | Collaborative Multi-Agent LLMs | Neo4j's GraphRAG Tools | Analysis |
|---|---|---|---|
| Total Unique Nodes Created | 112 | 18 | Neo4j's GraphRAG created less unique nodes than the Collaborative Multi-Agent LLMs, suggesting Collaborative Multi-Agent LLMs created more detailed knowledge representation. Both cover systems similar domains, but Collaborative Multi-Agent LLMs include additional or more varied node types. |
| Example Nodes | AirHeater, Boiler, Burner, CableManagement, EfficiencyImprovement, WaterTubeBoiler, Document, Deaerators, DeficientAir, DiagnosticTools, etc | Air openings, Boiler, Chunk, Corrosion, Deaerators, Document, Efficiency, Fuel, Hot water, Tubes, etc | |
| Total Unique Relationships Created | 20 | 9 | The Collaborative Multi-Agent LLMs has more unique relationships, suggesting a richer, more complex network of connections and specific associations between entities. compared to Neo4j's GraphRAG Tools. |
| Example Relationships | AFFECTS, HAS_COMPONENT, SUPPORTS, MEASURES, IMPLEMENTED_IN, REDUCES, SUPPORTS, USES, BETTER_THAN, COMMONLY_ASSOCIATED_WITH, CRITICAL_FOR, etc | AFFECTS, CAUSES, FIRST_CHUNK, HAS, HASTYPE, HAS_ENTITY, INCLUDE, etc | |
| Property Keys | Accessories, Accuracy, Action, Attributes, Diameter | Safety, Efficiency, Boiler | Collaborative Multi-Agent LLMs uses a diverse set of property keys, providing more detailed descriptors for entities and relationships |

The following JSON snippet demonstrates the initial hierarchical structure of the domain model for the "Boilers" entity. At this stage, attributes such as boiler horsepower and maximum pressure are placeholders awaiting further populated by the domain model populator agent.

```
{
  "Boilers": {
  "description": "Fuel-burning appliances that produce either hot water or
steam for heating or process uses.",
  "attributes": { },
  "sub-entities": {
  "Types of Boilers": {
  "description": "Classifications of boiler designs.",
  "attributes": { },
  "sub-entities": {
  "Fire-Tube Boilers": {
  "description": "Boilers where hot gases circulate through tubes
submerged in water.",
  "attributes": {
  "Boiler Horsepower": " ",
  "Maximum Pressure": " "
  },
  "relationships": {
  "Efficiency Institute": {
  "type": "Reprinted with permission of",
```

-continued

```
  "details": "The Boiler Efficiency Institute, Auburn, Alabama"
  }
      }
    },
```

The following JSON snippet demonstrates the populated data for "Fire-Tube Boilers," a subtype within the "Boilers" entity.

```
{"Boilers": {
  "description": "Fuel-burning appliances that produce either hot water or
steam for heating or process uses.",
  "attributes": { },
  "sub-entities": {
  "Types of Boilers": {
  "description": "Classifications of boiler designs.",
  "attributes": { },
  "sub-entities": {
  "Fire-Tube Boilers": {
  "description": "Boilers where hot gases circulate through tubes
submerged in water.",
  "attributes": {
  "Boiler Horsepower": "20 through 800 bhp",
  "Maximum Pressure": "150 psi"
  },
  "relationships": {
  "Efficiency Institute": {
```

-continued

Figure 4:
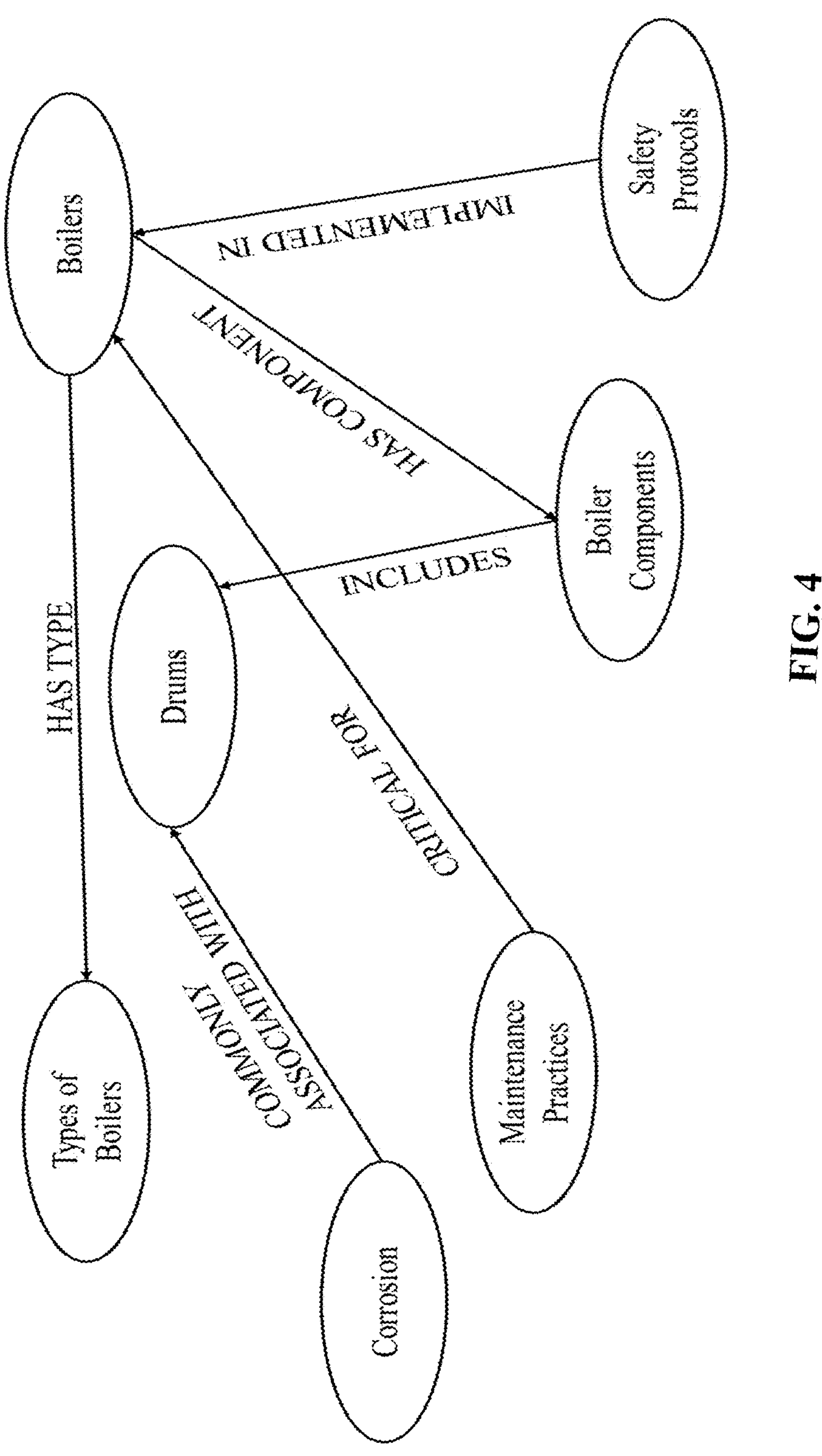
FIG. 4 depicts a partial knowledge graph of the unified knowledge graph generated using a plurality of populated domain models, in accordance with some embodiments of the present disclosure.

"type": "Reprinted with permission of",
"details": "The Boiler Efficiency Institute, Auburn, Alabama"
}
}
}, FIG. 4 depicts a partial knowledge graph of the unified knowledge graph generated using the plurality populated domain models, in accordance with some embodiments of the present disclosure.

The experimental results have demonstrated that the disclosed method generates more meaningful relationships between entities and reduce the time spent on manual document reading while improving the accuracy of query responses. By incorporating domain-specific knowledge and creating a more interconnected and context-aware unified knowledge graph, the disclosed method provides a more powerful tool for knowledge management tasks in data-intensive environments. The disclosed method highlights the potential of the plurality of collaborative multi-agent LLMs in transforming information retrieval processes and points towards further opportunities in refining knowledge graph generation, particularly in handling larger-scale documents and more intricate queries.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The disclosed method presents the collaborative multi-agent knowledge graph RAG framework by utilizing the plurality of collaborative multi-agent LLMs specifically tailored for generating the unified knowledge graph from the plurality of multimodal data sources. Unlike the conventional approaches employing the generalized collaborative framework, the disclosed method introduces the customized agents for generating the plurality of queries, the domain model generation, and populating the domain model. The plurality of populated domain models is generated for each chunk of for each chunk of the plurality of chunks, enabling the capture of information tailored to the specific context of that chunk. This results in the plurality of populated domain models that collectively enrich the unified knowledge graph, enhancing the capture of domain-specific insights rather than merely focusing on the extraction of entities, relationships, and events. This strategic emphasis on generation of the plurality of populated domain models ensures a more comprehensive understanding of the underlying data and its nuances.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, via one or more hardware processors, a plurality of multimodal documents, and a plurality of domain historical questions pertaining to the plurality of multimodal documents;

processing, via the one or more hardware processors, the plurality of multimodal documents to identify text and a plurality of images, using a python library;

chunking, via the one or more hardware processors, the text and the plurality of images into a plurality of chunks comprising a plurality of text chunks, and a plurality of image chunks; and generating, via the one or more hardware processors, a unified knowledge graph from the plurality of chunks, using a plurality of collaborative multi-agent large language models (LLMs), wherein the plurality of collaborative multi-agent LLMs comprises a query generator agent, a domain model generator agent, a domain model populator agent, and a knowledge graph curator agent, wherein generating the unified knowledge graph comprises:

(i) generating a plurality of queries associated with each chunk of the plurality of chunks, through the query generator agent comprises:

(a) building a query agent, by defining a plurality of query generator behavioral parameters, and a plurality of query generator functional specification parameters through an input JavaScript Object Notation (JSON) model, wherein the plurality of query generator behavioural parameters comprises a query generator role, an agent knowledge enriched using the plurality of domain historical questions, a query generator interface, and wherein the plurality of query generator functional specification parameters comprises a plurality of query generator actions, a plurality of tasks comprising a plurality of query generator tasks and a plurality of query generator evaluation tasks, a feedback from the plurality of collaborative multi-agent LLMs, and a plurality of query generator tools;

(b) formulating a query prompt template using a plurality of instructions, the plurality of chunks, an action, and the query agent;

(c) generating a query prompt using the query prompt template; and (d) feeding the query prompt to the query generator agent, to generate the plurality of queries associated with each chunk of the plurality of chunks;

(ii) generating a domain model associated with each chunk of the plurality of chunks based on the generated plurality of queries, through the domain model generator agent;

(iii) populating the generated domain model using each chunk of the plurality of chunks, to generate a populated domain model of a plurality of populated domain models for each chunk of the plurality of chunks, through the domain model populator agent; and (iv) generating the unified knowledge graph associated with each chunk of the plurality of chunks, using the plurality populated domain models, through the knowledge graph curator agent.

2. The processor implemented method of claim 1, wherein the generated unified knowledge graph is queried through a knowledge graph query agent by:

(a) receiving one or more queries pertaining to the plurality of multimodal documents from one or more users;

(b) building a unified knowledge graph query agent, by defining a plurality of knowledge graph query behavioral parameters, and a plurality of knowledge graph query functional specification parameters, wherein the plurality of knowledge graph query behavioral parameters comprises a domain model generator role, a domain knowledge, and a domain model generator interface, and wherein the plurality of knowledge graph query functional specification parameters comprises a plurality of domain model generator actions, a plurality of domain model generator tasks comprising a plurality of knowledge graph query tasks and a plurality of knowledge graph query evaluation tasks, the feedback from the plurality of collaborative multi-agent LLMs, and a plurality of domain model generator tools;

(c) formulating a knowledge graph query template using the plurality of instructions, a schema model, the one or more queries, and the unified knowledge graph query agent;

(d) generating a knowledge graph query prompt from the knowledge graph query prompt template;

(e) feeding the knowledge graph query prompt to the knowledge graph query agent, to generate a cypher query for a knowledge graph engine;

(f) generating a response comprising a graph data retrieved using a pattern matching from the unified knowledge graph, by the knowledge graph engine; and (g) processing the response from the knowledge graph engine along with one or more queries and a prompt to convert the graph data to a human interpretable natural language, using a Large Language Model (LLM).

3. The processor implemented method of claim 1, wherein the domain model associated with each chunk of the plurality of chunks based on the generated plurality of queries, through the domain model generator agent is generated by:

(a) building a domain model agent, by defining a plurality of domain model generator behavioral parameters, and a plurality of domain model generator functional specification parameters, wherein the plurality domain model generator behavioral parameters comprises the domain model generator role, the domain knowledge, the domain model generator interface, and wherein the plurality of domain model generator functional specification parameters comprises the plurality of domain model generator actions, the plurality of domain model generator tasks comprising a plurality of domain model generator query tasks and a plurality of domain model generator evaluation tasks, the feedback from the plurality of collaborative multi-agent LLMs, and the plurality of domain model generator tools;

(b) formulating a domain model generator prompt template using the plurality of instructions, the plurality of queries associated with each chunk of the plurality of chunks, and the action, and the domain model agent;

(c) generating a domain model generator prompt from the domain model generator prompt template; and (d) feeding the domain model generator prompt to the domain model generator agent, to generate the domain model associated with each chunk of the plurality of chunks based on the generated plurality of queries.

4. The processor implemented method of claim 1, wherein the generated domain model is populated, using each chunk of the plurality of chunks, to generate a populated domain model of a plurality of populated domain models for each chunk of the plurality of chunks, through the domain model populator agent comprises:

(a) building a domain model populating agent, by defining a plurality of domain model populator behavioral parameters, and a plurality of domain model populator functional specification parameters, wherein the plurality of domain model populator behavioral parameters comprise a domain model populator role, the domain knowledge, and a domain model populator interface, and wherein the domain model populator functional specification parameters comprise a plurality of domain model populator actions, a plurality of domain model populator tasks comprising a plurality of domain model populator query tasks and a plurality of domain model populator evaluation tasks, the feedback from the plurality of collaborative multi-agent LLMs, and a plurality of domain model populator tools;

(b) formulating a domain model populator prompt template using the plurality of instructions, the plurality of chunks, the domain model, the action, and the domain model populating agent;

(c) generating a domain model populator prompt from the domain model populator prompt template; and (d) feeding the domain model populator prompt to the domain model populator agent, to generate the plurality of populated domain models associated with each chunk of the plurality of chunks.

5. The processor implemented method of claim 1, wherein generation of the unified knowledge graph associated with each chunk of the plurality of chunks, using the plurality populated domain models, through the knowledge graph curator agent comprises:

(a) building a knowledge graph agent, by defining a plurality of knowledge graph curator behavioral parameters, and a plurality of knowledge graph curator functional specification parameters, wherein the plurality of knowledge graph curator behavioral parameters comprises a knowledge graph curator role, the domain knowledge, and a knowledge graph curator interface, and wherein the plurality of knowledge graph curator functional specification parameters comprise a plurality of knowledge graph curator actions, a plurality of knowledge graph curator tasks comprising a plurality of knowledge graph curator query tasks and a plurality of knowledge graph curator evaluation tasks, the feedback from the plurality of collaborative multi-agent LLMs, and a plurality of knowledge graph curator tools;

(b) formulating a knowledge graph curator prompt template using instructions, the plurality of populated domain model, the action, and the knowledge graph agent;

(c) generating a knowledge graph curator prompt from the knowledge graph curator prompt template; and (d) feeding the knowledge graph curator prompt to the knowledge graph curator agent, to generate the unified knowledge graph associated with each chunk of the plurality of chunks.

6. A system comprising:

a memory storing instructions;

one or more communication interfaces; and one or more hardware processors coupled to the memory via the one or more communication interfaces, wherein the one or more hardware processors are configured by the instructions to:

receive a plurality of multimodal documents, and a plurality of domain historical questions pertaining to the plurality of multimodal documents;

process the plurality of multimodal documents to identify text and a plurality of images, using a python library;

chunk the text and the plurality of images into a plurality of chunks comprising a plurality of text chunks, and a plurality of image chunks; and generate a unified knowledge graph from the plurality of chunks, using a plurality of collaborative multi-agent large language models (LLMs), wherein the plurality of collaborative multi-agent LLMs comprises a query generator agent, a domain model generator agent, a domain model populator agent, and a knowledge graph curator agent, wherein generating the unified knowledge graph comprises:

(i) generating a plurality of queries associated with each chunk of the plurality of chunks, through the query generator agent comprises:

(a) building a query agent, by defining a plurality of query generator behavioral parameters, and a plurality of query generator functional specification parameters through an input JavaScript Object Notation (JSON) model, wherein the plurality of query generator behavioral parameters comprises a query generator role, an agent knowledge enriched using the plurality of domain historical questions, a query generator interface, and wherein the plurality of query generator functional specification parameters comprises a plurality of query generator actions, a plurality of query tasks comprising a plurality of query generator tasks and a plurality of query generator evaluation tasks, a feedback from the plurality of collaborative multi-agent LLMs, and a plurality of query generator tools;

(b) formulating a query prompt template using a plurality of instructions, the plurality of chunks, an action, and the query agent;

(c) generating a query prompt using the query prompt template; and (d) feeding the query prompt to the query generator agent, to generate the plurality of queries associated with each chunk of the plurality of chunks;

(ii) generating a domain model associated with each chunk of the plurality of chunks based on the generated plurality of queries, through the domain model generator agent;

(iii) populating the generated domain model using each chunk of the plurality of chunks, to generate a populated domain model of a plurality of populated domain models for each chunk of the plurality of chunks, through the domain model populator agent; and (iv) generating the unified knowledge graph associated with each chunk of the plurality of chunks, using the plurality populated domain models, through the knowledge graph curator agent.

7. The system of claim 6, wherein the generated unified knowledge graph is queried through a knowledge graph query agent by:

(a) receiving one or more queries pertaining to the plurality of multimodal documents from one or more users;

(b) building a unified knowledge graph query agent, by defining a plurality of knowledge graph query behavioral parameters, and a plurality of knowledge graph query functional specification parameters, wherein the plurality of knowledge graph query behavioral parameters comprise a domain model generator role, a domain knowledge, and a domain model generator interface, and wherein the plurality of knowledge graph query functional specification parameters comprises a plurality of domain model generator actions, a plurality of domain model generator tasks comprising a plurality of knowledge graph query tasks and a plurality of knowledge graph query evaluation tasks, the feedback from the plurality of collaborative multi-agent LLMs, and a plurality of domain model generator tools;

(c) formulating a knowledge graph query template using the plurality of instructions, a schema model, the one or more queries, and the unified knowledge graph query agent;

(d) generating a knowledge graph query prompt from the knowledge graph query prompt template;

(e) feeding the knowledge graph query prompt to the knowledge graph query agent, to generate a cypher query for a knowledge graph engine;

(f) generating a response comprising a graph data retrieved using a pattern matching from the unified knowledge graph, by the knowledge graph engine; and (g) processing the response from the knowledge graph engine along with the one or more queries and a prompt to convert the graph data to a human interpretable natural language, using a Large Language Model (LLM).

8. The system of claim 6, wherein the domain model associated with each chunk of the plurality of chunks based on the generated plurality of queries, through the domain model generator agent is generated by:

(a) building a domain model agent, by defining the plurality of domain model generator behavioral parameters, and the plurality of domain model generator functional specification parameters, wherein the plurality of domain model generator behavioral parameters comprises the domain model generator role, the domain knowledge, the domain model generator interface, and wherein the plurality of domain model generator functional specification parameters comprises the plurality of domain model generator actions, the plurality of domain model generator tasks comprising a plurality of domain model generator query tasks and a plurality of domain model generator evaluation tasks, and the feedback from the plurality of collaborative multi-agent LLMs, and a plurality of domain model generator tools;

(b) formulating a domain model generator prompt template using the plurality of instructions, the plurality of queries associated with each chunk of the plurality of chunks, and the action, and the domain model agent;

(c) generating a domain model generator prompt from the domain model generator prompt template; and (d) feeding the domain model generator prompt to the domain model generator agent, to generate the domain model associated with each chunk of the plurality of chunks based on the generated plurality of queries.

9. The system of claim 6, wherein the generated domain model is populated, using each chunk of the plurality of chunks, to generate a populated domain model of a plurality of populated domain models for each chunk of the plurality of chunks, through the domain model populator agent comprises:

(a) building a domain model populating agent, by defining a plurality of domain model populator behavioral parameters, and a plurality of domain model populator functional specification parameters, wherein the plurality of domain model populator behavioral parameters comprise a domain model populator role, the domain knowledge, and a domain model populator interface, and wherein the domain model populator functional specification parameters comprise a plurality of domain model populator actions, a plurality of domain model populator tasks comprising a plurality of domain model populator query tasks and a plurality of domain model populator evaluation tasks, the feedback from the plurality of collaborative multi-agent LLMs, and a plurality of domain model populator tools;

(b) formulating a domain model populator prompt template using the plurality of instructions, the plurality of chunks, the domain model, the action, and the domain model populating agent;

(c) generating a domain model populator prompt from the domain model populator prompt template; and (d) feeding the domain model populator prompt to the domain model populator agent, to generate the plurality of populated domain models associated with each chunk of the plurality of chunks.

10. The system of claim 6, wherein generation of the unified knowledge graph associated with each chunk of the plurality of chunks, using the plurality populated domain models, through the knowledge graph curator agent comprises:

(a) building a knowledge graph agent, by defining a plurality of knowledge graph curator behavioral parameters, and a plurality of knowledge graph curator functional specification parameters, wherein the plurality of knowledge graph curator behavioural parameters comprises a knowledge graph curator role, the domain knowledge, an knowledge graph curator interface, wherein the plurality of knowledge graph curator functional specification parameters comprises a plurality of knowledge graph curator actions, a plurality of knowledge graph curator tasks comprising a plurality of knowledge graph curator query tasks, a plurality of knowledge graph curator evaluation tasks, the feedback from the plurality of collaborative multi-agent LLMs, and a plurality of knowledge graph curator generator tools;

(b) formulating a knowledge graph curator prompt template using instructions, the plurality of populated domain model, the action, and the knowledge graph agent;

(c) generating a knowledge graph curator prompt from the knowledge graph curator prompt template; and (d) feeding the knowledge graph curator prompt to the knowledge graph curator agent, to generate the unified knowledge graph associated with each chunk of the plurality of chunks.

11. One or more non-transitory machine-readable information storage mediums comprising one or more instructions which when executed by one or more hardware processors cause:

receiving a plurality of multimodal documents, and a plurality of domain historical questions pertaining to the plurality of multimodal documents;

processing the plurality of multimodal documents to identify text and a plurality of images, using a python library;

chunking the text and the plurality of images into a plurality of chunks comprising a plurality of text chunks, and a plurality of image chunks; and generating a unified knowledge graph from the plurality of chunks, using a plurality of collaborative multi-agent large language models (LLMs), wherein the plurality of collaborative multi-agent LLMs comprises a query generator agent, a domain model generator agent, a domain model populator agent, and a knowledge graph curator agent, wherein generating the unified knowledge graph comprises:

(i) generating a plurality of queries associated with each chunk of the plurality of chunks, through the query generator agent comprises:

(a) building a query agent, by defining a plurality of query generator behavioral parameters, and a plurality of query generator functional specification parameters through an input JavaScript Object Notation (JSON) model, wherein the plurality of query generator behavioural parameters comprises a query generator role, an agent knowledge enriched using the plurality of domain historical questions, a query generator interface, and wherein the plurality of query generator functional specification parameters comprises a plurality of query generator actions, a plurality of tasks comprising a plurality of query generator tasks and a plurality of query generator evaluation tasks, a feedback from the plurality of collaborative multi-agent LLMs, and a plurality of query generator tools;

(b) formulating a query prompt template using a plurality of instructions, the plurality of chunks, an action, and the query agent;

(c) generating a query prompt using the query prompt template; and (d) feeding the query prompt to the query generator agent, to generate the plurality of queries associated with each chunk of the plurality of chunks;

(ii) generating a domain model associated with each chunk of the plurality of chunks based on the generated plurality of queries, through the domain model generator agent;

(iii) populating the generated domain model using each chunk of the plurality of chunks, to generate a populated domain model of a plurality of populated domain models for each chunk of the plurality of chunks, through the domain model populator agent; and (iv) generating the unified knowledge graph associated with each chunk of the plurality of chunks, using the plurality populated domain models, through the knowledge graph curator agent.

12. The one or more non-transitory machine-readable information storage mediums of claim 11, wherein the generated unified knowledge graph is queried through a knowledge graph query agent by:

(a) receiving one or more queries pertaining to the plurality of multimodal documents from one or more users;

(b) building a unified knowledge graph query agent, by defining a plurality of knowledge graph query behavioral parameters, and a plurality of knowledge graph query functional specification parameters, wherein the plurality of knowledge graph query behavioral parameters comprises a domain model generator role, a domain knowledge, and a domain model generator interface, and wherein the plurality of knowledge graph query functional specification parameters comprises a plurality of domain model generator actions, a plurality of domain model generator tasks comprising a plurality of knowledge graph query tasks and a plurality of knowledge graph query evaluation tasks, the feedback from the plurality of collaborative multi-agent LLMs, and a plurality of domain model generator tools;

(c) formulating a knowledge graph query template using the plurality of instructions, a schema model, the one or more queries, and the unified knowledge graph query agent;

(d) generating a knowledge graph query prompt from the knowledge graph query prompt template;

(e) feeding the knowledge graph query prompt to the knowledge graph query agent, to generate a cypher query for a knowledge graph engine;

(f) generating a response comprising a graph data retrieved using a pattern matching from the unified knowledge graph, by the knowledge graph engine; and (g) processing the response from the knowledge graph engine along with one or more queries and a prompt to convert the graph data to a human interpretable natural language, using a Large Language Model (LLM).

13. The one or more non-transitory machine-readable information storage mediums of claim 11, wherein the domain model associated with each chunk of the plurality of chunks based on the generated plurality of queries, through the domain model generator agent is generated by:

(a) building a domain model agent, by defining a plurality of domain model generator behavioral parameters, and a plurality of domain model generator functional specification parameters, wherein the plurality domain model generator behavioral parameters comprises the domain model generator role, the domain knowledge, the domain model generator interface, and wherein the plurality of domain model generator functional specification parameters comprises the plurality of domain model generator actions, the plurality of domain model generator tasks comprising a plurality of domain model generator query tasks and a plurality of domain model generator evaluation tasks, the feedback from the plurality of collaborative multi-agent LLMs, and the plurality of domain model generator tools;

(b) formulating a domain model generator prompt template using the plurality of instructions, the plurality of queries associated with each chunk of the plurality of chunks, and the action, and the domain model agent;

(c) generating a domain model generator prompt from the domain model generator prompt template; and (d) feeding the domain model generator prompt to the domain model generator agent, to generate the domain model associated with each chunk of the plurality of chunks based on the generated plurality of queries.

14. The one or more non-transitory machine-readable information storage mediums of claim 11, wherein the generated domain model is populated, using each chunk of the plurality of chunks, to generate a populated domain model of a plurality of populated domain models for each chunk of the plurality of chunks, through the domain model populator agent comprises:

(a) building a domain model populating agent, by defining a plurality of domain model populator behavioral parameters, and a plurality of domain model populator functional specification parameters, wherein the plurality of domain model populator behavioral parameters comprise a domain model populator role, the domain knowledge, and a domain model populator interface, and wherein the domain model populator functional specification parameters comprise a plurality of domain model populator actions, a plurality of domain model populator tasks comprising a plurality of domain model populator query tasks and a plurality of domain model populator evaluation tasks, the feedback from the plurality of collaborative multi-agent LLMs, and a plurality of domain model populator tools;

(b) formulating a domain model populator prompt template using the plurality of instructions, the plurality of chunks, the domain model, the action, and the domain model populating agent;

(c) generating a domain model populator prompt from the domain model populator prompt template; and (d) feeding the domain model populator prompt to the domain model populator agent, to generate the plurality of populated domain models associated with each chunk of the plurality of chunks.

15. The one or more non-transitory machine-readable information storage mediums of claim 11, wherein generation of the unified knowledge graph associated with each chunk of the plurality of chunks, using the plurality populated domain models, through the knowledge graph curator agent comprises:

(a) building a knowledge graph agent, by defining a plurality of knowledge graph curator behavioral parameters, and a plurality of knowledge graph curator functional specification parameters, wherein the plurality of knowledge graph curator behavioral parameters comprises a knowledge graph curator role, the domain knowledge, and a knowledge graph curator interface, and wherein the plurality of knowledge graph curator functional specification parameters comprise a plurality of knowledge graph curator actions, a plurality of knowledge graph curator tasks comprising a plurality of knowledge graph curator query tasks and a plurality of knowledge graph curator evaluation tasks, the feedback from the plurality of collaborative multi-agent LLMs, and a plurality of knowledge graph curator tools;

(b) formulating a knowledge graph curator prompt template using instructions, the plurality of populated domain model, the action, and the knowledge graph agent;

(c) generating a knowledge graph curator prompt from the knowledge graph curator prompt template; and (d) feeding the knowledge graph curator prompt to the knowledge graph curator agent, to generate the unified knowledge graph associated with each chunk of the plurality of chunks.

* * * * *